United States Patent [19]

Sawada et al.

[11] Patent Number: 5,300,245

[45] Date of Patent: Apr. 5, 1994

[54] WORKING FLUID COMPOSITION HAVING KETONE-CONTAINING COMPOUND FOR USE IN REFRIGERATION SYSTEM

[75] Inventors: Hiroki Sawada, Wakayama; Toshiya Hagihara, Izumisano; Yuichiro Kobayashi, Wakayama; Akimitsu Sakai, Wakayama; Hideo Suzuki, Wakayama; Toshihiro Tanaka, Wakayama; Hiroshi Nagumo, Wakayama; Yukinaga Yokota, Hannan, all of Japan

[73] Assignee: Kao Corporation, Tokyo, Japan

[21] Appl. No.: 906,449

[22] Filed: Jun. 30, 1992

[30] Foreign Application Priority Data

Jul. 1, 1991 [JP] Japan ................... 3-160297
Dec. 13, 1991 [JP] Japan ................... 3-352451

[51] Int. Cl.$^5$ .................. C09K 5/04; C10M 105/20
[52] U.S. Cl. ................... 252/68; 252/52 R; 252/52 A; 252/67
[58] Field of Search ............ 252/68, 69, 67, 52 R, 252/52 A; 568/337

[56] References Cited

U.S. PATENT DOCUMENTS

| | | | |
|---|---|---|---|
| 3,909,431 | 9/1975 | Figiel | 252/68 |
| 4,192,949 | 3/1980 | Merger et al. | 568/337 |
| 4,755,316 | 7/1988 | Magid et al. | 252/68 |
| 4,851,144 | 7/1989 | McGraw et al. | 252/52 A |
| 4,963,282 | 10/1990 | Jolley et al. | 252/67 |
| 5,021,179 | 6/1991 | Zehler et al. | 252/54.6 |

FOREIGN PATENT DOCUMENTS

| | | |
|---|---|---|
| 0030127 | 6/1981 | European Pat. Off. . |
| 0406479 | 1/1991 | European Pat. Off. . |
| 1-198694 | 8/1989 | Japan . |
| 1-256594 | 10/1989 | Japan . |
| 1-259093 | 10/1989 | Japan . |
| 1-259094 | 10/1989 | Japan . |
| 1-259095 | 10/1989 | Japan . |
| 2-84491 | 3/1990 | Japan . |
| 2-102296 | 4/1990 | Japan . |
| 2-129294 | 5/1990 | Japan . |
| 2-132176 | 5/1990 | Japan . |
| 2-132177 | 5/1990 | Japan . |
| 2-132178 | 5/1990 | Japan . |
| 2-132179 | 5/1990 | Japan . |
| 2-158693 | 6/1990 | Japan . |
| 2-173195 | 7/1990 | Japan . |
| 2-180986 | 7/1990 | Japan . |
| 2-180987 | 7/1990 | Japan . |
| 2-182780 | 7/1990 | Japan . |
| 2-242823 | 9/1990 | Japan . |
| 2-242888 | 9/1990 | Japan . |
| 2-258896 | 10/1990 | Japan . |
| 2-269195 | 11/1990 | Japan . |
| 2-272097 | 11/1990 | Japan . |
| 2-276880 | 11/1990 | Japan . |
| 2-276881 | 11/1990 | Japan . |
| 2-281098 | 11/1990 | Japan . |
| 2-305893 | 12/1990 | Japan . |
| 3-14894 | 1/1991 | Japan . |
| 3-28296 | 2/1991 | Japan . |
| 3-33193 | 2/1991 | Japan . |
| 333192 | 2/1991 | Japan . |
| 4-126716 | 4/1992 | Japan . |
| 90/05174 | 5/1990 | World Int. Prop. O. . |

*Primary Examiner*—Christine Skane
*Attorney, Agent, or Firm*—Birch, Stewart, Kolasch & Birch

[57] ABSTRACT

A working fluid composition for use in a refrigeration system which comprises a refrigerating oil comprising a compound having one or more ketone groups in the molecular structure as a base oil and a hydrofluorocarbon.

5 Claims, No Drawings

WORKING FLUID COMPOSITION HAVING KETONE-CONTAINING COMPOUND FOR USE IN REFRIGERATION SYSTEM

FIELD OF THE INVENTION

The present invention relates to a working fluid composition for use in refrigeration systems, and more specifically to a working fluid composition used for compression in refrigerating devices, e.g., electric refrigerators, air conditioners and the like.

BACKGROUND OF THE INVENTION

The use of dichlorodifluoromethane (CFC12) for refrigerators and automotive air conditioners has recently been legally regulated to protect the ozone layer, and will eventually be totally banned. The use of chlorodifluoromethane (HCFC22) for air conditioners will be regulated. Thus, hydrofluorocarbons (HFC) which do not destroy the ozone layer have been developed as substitutes for CFC12.

However, since the polarity of hydrofluorocarbons is higher than that of CFC12, the use of a conventional lubricating oil which has commonly been used as a refrigeration oil, such as naphthenic mineral oil, poly α-olefin or alkylbenzene, causes two-layer separation at a low temperature due to the poor compatibility between these lubricating oils and hydrofluorocarbons. Two-layer separation hampers oil return, which in turn interferes with heat transfer due to the deposition of a thick oil film around the condenser and evaporator as heat exchangers. It can also cause failures due to poor lubrication and foaming during the starting operation. Therefore, the conventional refrigeration oils cannot be used in the presence of these new refrigerants.

As for lubricity, CFC12 generates hydrogen chloride upon partial decomposition, which reacts on the friction surface to form a chloride coating, thereby improving its lubricity. On the other hand, the hydrofluorocarbons cannot be expected to have such an effect because they do not contain a chlorine atom, and therefore, the refrigeration oils used in combination with hydrofluorocarbons are required to have better lubricity than that of the conventional refrigeration oils.

In addition, the refrigeration oils used in combination with hydrofluorocarbons need to have good thermal stability in the presence of hydrofluorocarbons.

Moreover, since organic substances are present in compression refrigerating machines for electric refrigerators, for example, materials for motor components such as insulators and enameled wires, the working fluid comprising a hydrofluorocarbon and a refrigeration oil must not adversely affect these organic materials and must have a good insulating property.

Polyether compounds which can be used as refrigeration oils in combination with hydrofluorocarbons such as 1,1,1,2-tetrafluoroethane (HFC134a) are disclosed in U.S. Pat. No. 4,755,316, Japanese Patent Laid-Open Nos. 198694/1989, 256594/1989, 259093/1989, 259094/1989, 259095/1989, 84491/1990, 102296/1990, 129294/1990, 132176/1990, 132177/1990, 132178/1990, 132179/1990, 173195/1990, 180986/1990, 180987/1990, 182780/1990, 242823/1990, 242888/1990, 258896/1990, 269195/1990, 276880/1990, 276881/1990, 272097/1990, 281098/1990, 305893/1990, 14894/1991, 28296/1991, 33192/1991, 33193/1991 and other publications.

Since the polyether compounds have a polarity higher than that of naphthenic mineral oils, their compatibility with HFC134a at a low temperature is very good. However, polyether compounds cannot be safely used as refrigeration oils, since they pose the problem of two-layer separation upon a rise in temperature, as stated in U.S. Pat. No. 4,755,316.

The polyether compounds involve other problems. One of them is that they have a poor insulating property. This is an extremely important problem which makes it impossible to use the polyether compounds for refrigerating machines used in electric refrigerators. Another problem is that they have high hygroscopicity. Due to the moisture in the polyether compound, the thermal stability in the presence of HFC134a is degraded, causing organic materials such as PET films to be hydrolyzed.

In order to eliminate the above-mentioned problems in the polyether compounds such as insulating property, hygroscopicity, etc., various ester compounds have been developed. For instance, as refrigerating oils which can be used together with 1,1,1,2-tetrafluoroethane (HFC134a), mixed oils of polyether oils and ester oils are disclosed in U.S. Pat. No. 4,851,144 (corresponding to Japanese Patent Laid-Open No. 276894/1990) and Japanese Patent Laid-Open No. 158693/1990; and ester oils are disclosed in U.S. Pat. No. 2,261,541 and European Patent No. 406,479.

The ester compounds are excellent in compatibility with the hydrofluorocarbons, and they are also excellent in thermal stability in the presence of the hydrofluorocarbons. In addition, when compared with the polyether compounds, the ester compounds have a remarkably excellent insulating property and a considerably low hygroscopicity.

However, hydrofluorocarbon-ester oils are more likely to absorb moisture because of the increased polarity of hydrofluorocarbon and oil in comparison with CFC12-mineral oils, which constitute conventional working fluids, and the water which remains unremoved can hydrolyze the ester to form carboxylic acid, which may in turn corrode metals to cause wear.

As stated above, the presently developed hydrofluorocarbonpolyether oils have problems in hygroscopicity and insulating property, and the hydrofluorocarbon-ester oils have problems in hydrolysis resistance. In addition, when compared with the conventional CFC12-mineral oils, they are more likely to absorb water, which may cause a decrease in thermal stability and the deterioration of the organic materials, which may in turn corrode metals and cause wear. Therefore, these oils do not meet the requirement of a working fluid for refrigerating machines.

SUMMARY OF THE INVENTION

Accordingly, it is an object of the present invention to provide a working fluid composition for use in a refrigeration system used in electric refrigerators, etc. which is free from the above problems, thereby possessing excellent compatibility and thermal stability, and exhibiting little problem in hydrolysis and low hygroscopicity.

As a result of intensive investigations with the aim of accomplishing the objects described above, the present inventors have found that the present invention can be achieved by the use of an oil for use in refrigeration systems comprising a compound having one or more groups having a ketone structure, hereinafter simply referred to as "ketone group," in the molecular structure as a base oil.

In essence, the present invention is directed to providing a working fluid composition for use in refrigeration systems containing an oil for refrigerating systems comprising a compound having one or more ketone groups in the molecular structure as a base oil and a hydrofluorocarbon.

Although the compound which can be used for the present invention having one or more ketone groups in the molecular structure thereof, is not subject to limitations as to carbon number, its carbon number is usually 3 to 500, preferably 6 to 300 and more preferably 9 to 120. The molecular weight thereof is usually not less than 100 and not more than 10,000, preferably not less than 100 and not more than 5,000, and still more preferably not less than 100 and not more than 2,000. Although the number of ketone groups contained in the molecular structure of the compound which can be used in the present invention is not subject to limitations, as long as it is one or more, it is usually 1 to 200, preferably 1 to 60. In addition to ketone groups, the molecular structure may contain hydroxyl groups, groups having an ether structure, groups having an ester structure and groups having an aldehyde structure. The compounds which can be used in the present invention may be linear or branched. It is desirable, however, that no aliphatic unsaturated bonds are present therein.

The compound which can be used in the present invention may be a chain compound or a cyclic compound. Preferable chain compounds having no groups other than ketone groups in the molecular structure thereof are exemplified by the polyketone compound represented by the following Formula (I). Preferable cyclic compounds are exemplified by the monocyclic or dicyclic compound which may contain an oxygen atom in the ring thereof represented by the following Formula (II), having a substituent containing one or more ketone groups in the molecular structure thereof.

DETAILED DESCRIPTION OF THE INVENTION

Examples of the compound which can be used in the present invention having one or more ketone groups in the molecular structure thereof include compounds which can be synthesized as follows:

Specifically, examples include compounds obtained by oxidizing an alcohol having a carbon number of 3 to 200 including a monohydric alcohol such as 2-decanol, 2,6-dimethyl-4-heptanol and 6-methyl-2-heptanol, a dihydric alcohol such as 2,2,4-trimethyl-1,3-pentanediol and 2-methyl-2,4-pentanediol, a polyhydric alcohol such as a polyvinyl alcohol and a glycerol condensation product and the like, with oxidants such as chromic acid, chromium oxide, manganese dioxide, dimethyl sulfoxide, hypohalogenous acid and the like. Examples also include compounds having a carbon number of 3 to 200 obtained by reacting a carboxylic acid halide such as 2-ethylhexanoyl chloride, heptanoyl chloride and the like with an aromatic compound such as benzene, toluene, naphthalene, diphenyl ether and the like, or with an alkylsilane such as tetraethylsilane, trimethylallylsilane and the like in the presence of a Lewis acid such as AlCl$_3$, TiCl$_4$ and the like used as a catalyst. Examples also include compounds having a carbon number of 3 to 200 obtained by hydrolyzing and then thermally decomposing a glycidic acid ester derivative such as methyl 2,3-epoxy-2-methyl-3-(2-methoxyphenyl)propionate and the like (H. H. Morris and M. L. Lusth, J. Am. Chem. Soc., 76, 1237 (1954)). Examples also include compounds having a carbon number of 3 to 100 obtained by reacting a carboxylic acid such as stearic acid, adipic acid and the like in the presence of a metal oxide such as magnesium oxide and the like used as a catalyst. Examples also include compounds having a carbon number of 4 to 200 obtained by reacting a ketone such as acetone, methyl ethyl ketone, isopropyl methyl ketone, diisopropyl ketone, methyl isobutyl ketone, cyclohexanone and the like with formaldehyde in the presence of an alkaline catalyst such as sodium hydroxide and the like. Examples also include compounds having a carbon number of 4 to 200 obtained by reacting a ketone such as acetone, methyl ethyl ketone, isopropyl methyl ketone, diisopropyl ketone, acetylacetone and the like, with a base such as potassium tert-butoxide, NaH and the like and then with an alkyl halide such as benzyl chloride, 2-ethylhexyl iodide and the like. Examples also include compounds having a carbon number of 5 to 200 obtained by adding a ketone such as acetone, acetylacetone, acetonylacetone and the like to an olefin such as 1-octene in the presence of an organic peroxide such as benzoyl peroxide and the like used as an initiator. Preferable chain compounds having no groups other than ketone groups in the molecular structure thereof are exemplified by the polyketone compound represented by the following Formula (I):

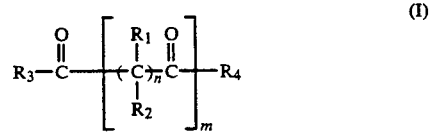

In the formula, R$_1$ and R$_2$, which may be identical or different, independently represent a hydrogen atom, a linear or branched alkyl group, alkenyl group or arylalkyl group having a carbon number of 1 to 36, or a phenyl group which may be substituted with a linear or branched alkyl group or alkenyl group having a carbon number of 1 to 15; R$_3$ and R$_4$, which may be identical or different, independently represent a linear or branched alkyl group, alkenyl group or arylalkyl group having a carbon number of 1 to 36, or a phenyl group which may be substituted with a linear or branched alkyl group or alkenyl group having a carbon number of 1 to 15; n represents an integer of 1 to 19; and m represents an integer of 1 to 5.

In Formula (I), examples of linear or branched alkyl groups, alkenyl groups or arylalkyl groups having a carbon number of 1 to 36, or phenyl groups which may be substituted with the linear or branched alkyl groups or alkenyl groups having a carbon number of 1 to 15 represented by R$_1$, R$_2$, R$_3$ and R$_4$ include linear alkyl groups such as methyl group, ethyl group, propyl group, butyl group, pentyl group, heptyl group, octyl group, nonyl group, decyl group, undecyl group, lauryl group, myristyl group, palmityl group, stearyl group and the like; branched alkyl groups such as isopropyl group, isobutyl group, isoamyl group, 2-ethylhexyl group, neodecyl group, isostearyl group, 2-heptylundecyl group and the like; and alkenyl groups such as vinyl group, propenyl group, isobutenyl group and the like; and phenyl group, methylphenyl group, benzyl group and the like.

In Formula (I), n represents an integer of 1 to 19, preferably 1 to 4, and m represents an integer of 1 to 5. When n exceeds 19, the compatibility of the polyketone compounds with the hydrofluorocarbon is insufficient.

In Formula (I), a total carbon number of $R_1$ and $R_2$ is preferably not more than 24, and each of $R_3$ and $R_4$ preferably has a carbon number of not more than 25.

The compounds represented by Formula (I) as described above may be of various kinds, without being restricted to any particular compounds.

Specifically, examples thereof are as follows: 3-octyl-2,4-pentanedione, 3-decyl-2,4-pentanedione, 3-isoamyl-2,4-pentanedione, 3-(2-ethylhexyl)-2,4-pentanedione, 3-(2-hexyldecyl)-2,4-pentanedione, 2,4-tridecanedione, 2,4-pentadecanedione, 8-methyl-2,4-nonanedione, 7-ethyl-2,4-undecanedione, 7-hexyl-2,4-pentadecanedione, 3-octyl-2,5-hexanedione, 3-decyl-2,5-hexanedione, 3-isoamyl-2,5-hexanedione, 3-(2-ethylhexyl)-2,5-hexanedione, 3-(2-hexyldecyl)-2,5-hexanedione, 2,5-tetradecanedione, 2,5-hexadecanedione, 10-methyl-2,5-undecanedione, 8-ethyl-2,5-dodecanedione, 8-hexyl-2,5-hexadecanedione, 3-(2-methylpropenyl)-2,4-pentanedione, 3-benzyl-2,4-pentanedione, 3-phenyl-2,4-pentanedione, 3-octyl-2,4,6-heptanetrione, and the like.

In addition, the cyclic compounds which can be used in the present invention are preferably monocyclic or dicyclic compounds which may contain an oxygen atom in the ring thereof represented by Formula (II), having a substituent containing one or more ketone groups in the molecular structure.

(II)

In the formula, Q represents a monocyclic or dicyclic compound which may contain an oxygen atom in the ring thereof. $R_5$ represents a substituent having one or more ketone groups in the molecular structure, and $R_6$ represents a substituent having one or more ether groups in the molecular structure. x represents an integer of 1 to 20, and y represents an integer of 0 to 20. When x is two or more, each $R_5$ may be identical or different, and when y is two or more, each $R_6$ may be identical or different.

In Formula (II), examples of the monocyclic or dicyclic compounds which may contain an oxygen atom in the ring thereof represented by Q include aromatic hydrocarbons such as benzene, biphenyl, naphthalene and the like; and aromatic heterocyclic compounds such as furan, pyrane, and their hydrogenated compounds and the like. These compounds can be substituted with alkyl groups having a linear or branched structure.

In Formula (II), examples of substituents containing one or more ketone groups in the molecular structure represented by $R_5$ include aliphatic acyl groups having a linear or branched structure such as acetyl group, propionyl group, butyryl group, octanoyl group and the like; aromatic acyl groups such as benzoyl group, toluoyl group and the like; ketoacyl groups such as ketopropionyl group, ketobutyryl group and the like; acylalkyl groups such as acetylmethyl group, isobutyrylethyl group, benzoylmethyl group and the like; acylalkyloxy groups or acylaryloxy groups such as acetylmethoxy group, isobutyrylethoxy group, acetylphenoxy group and the like; alkyloxyacyl groups such as methoxyacetyl group, ethoxypropanoyl group, and the like; and aryloxyacyl groups such as phenoxyacetyl group and the like.

In Formula (II), examples of the substituents containing one or more ether groups in the molecular structure represented by $R_6$ include alkyloxy groups or aryloxy groups such as methoxy group, ethoxy group, phenoxy group and the like; and alkyloxyalkyl groups or aryloxyalkyl groups such as methoxymethyl group, isopropoxyethyl group, phenoxymethyl group and the like.

In Formula (II), x represents an integer of 1 to 20, and y represents an integer of 0 to 20. The preferred x is an integer of 1 to 4, and the preferred y is an integer of 0 to 4. When x and y each exceeds 20, the fluidity of the cyclic compound at a low temperature is insufficient. In addition, when y is 0, namely in the case where the compound does not have a substituent containing one or more ether groups in the molecular structure, the compatibility of the cyclic compound with the hydrofluorocarbons may be insufficient in certain cases. Therefore, more preference is given to the case where y is 1 to 4. When x and y are each two or more, each of the respective $R_5$ or $R_6$ can be identical or different.

The compounds represented by Formula (II) as described above may be of various kinds, without being restricted to particular ones. Examples thereof include 1-acetyl-4-dodecylbenzene (soft alkyl type), 1-(2-ethylhexanoyl)-4-isopropylbenzene, 1-acetyl-3-methoxybenzene, 4-ethoxy-1-(2-ethylhexanoyl)benzene, 1-(2-ethylhexanoyl)-3,4-dimethoxybenzene, 3,4-dimethoxyphenylacetone, 4-isoamyl-1-($\beta$-ketobutyryl)-benzene, 4-methoxy-1-methoxyacetyl-2-methylbenzene, 1-acetylmethoxy-2-methoxybenzene, 3-acetyl-2,5-dimethylfuran, 1-acetyl-2-methoxycyclohexane, 2-acetylcoumaran, and the like.

The viscosity of these compounds having one or more ketone groups in the molecular structure is preferably from 0.5 to 100 cst at 100° C., more preferably from 0.5 to 30 cst. When the viscosity at 100° C. exceeds 100 cst, the compatibility of these compounds with the hydrofluorocarbons is poor. In addition, the viscosity of these compounds at 40° C. is preferably 1 to 10,000 cst, more preferably 1 to 1,000 cst. Further, even among the compounds having a viscosity of 0.5 to 100 cst at 100° C., it is desired that the two-layer separation temperature at a low temperature with the hydrofluorocarbons is low, preferably not more than 0° C., more preferably not more than −10° C.

The compound having one or more ketone groups in the molecular structure which can be used in the present invention can be mixed with mineral oils or synthetic oils such as poly α-olefin, alkylbenzene, ester, polyether, perfluoropolyether, phosphate and the like, in proportion so as not to lose its compatibility with the hydrofluorocarbon.

In addition, the refrigerating oil comprising a compound having one or more ketone groups in the molecular structure as a base oil which can be used in the present invention may contain the following additives, if necessary.

Specifically, for the purpose of trapping water or acids in the composition, it is effective to add a compound containing an epoxy group or additives such as an orthoester, an acetal and the like. For the purpose of improving lubricity, it is effective to add extreme-pressure additives and oiliness improving agents such as triaryl phosphate, triaryl phosphite, trialkyl phosphate, trialkyl phosphite, zinc alkyldithiophosphate, zinc aryldithiophosphate, molybdenum dithiophosphate, molybdenum dithiocarbamate and the like, or compounds having two hydroxyl groups at adjacent positions such as tartarate, glyceryl ether, glyceryl ester and the like. For the purpose of improving thermal stability, it is effective to add phenolic compounds or aromatic amine compounds having a radical trapping function.

The compounds having epoxy groups used in the present invention include glycidyl ether compounds and alicyclic epoxy compounds, with preference given to compounds having an epoxycyclohexyl group and an epoxycyclopentyl group. The epoxy compounds used in the present invention have a carbon number of 5 to 60, preferably 5 to 40, and more preferably 5 to 25. The addition amount of these compounds is 0.05 to 5.0 parts by weight, preferably 0.05 to 2.0 parts by weight to 100 parts by weight of the base oil for the present invention.

The orthoester and the acetal which can be used in the present invention have a carbon number of 3 to 75, and the addition amount thereof is 0.01 to 100 parts by weight to 100 parts by weight of the base oil. The extreme-pressure additives and oiliness improving agents which can be used in the present invention have a carbon number of 3 to 70, and the addition amount thereof is 0.1 to 5.0 parts by weight to 100 parts by weight of the base oil.

The compounds having two hydroxyl groups at adjacent positions which can be used in the present invention have a carbon number of 6 to 75, and the addition amount thereof is 0.01 to 100 parts by weight to 100 parts by weight of the base oil. In addition, the phenolic compounds or aromatic amine compounds which can be used in the present invention have a radical trapping function, and they have a carbon number of 6 to 100. The addition amount thereof is 0.05 to 2.0 parts by weight to 100 parts by weight of the base oil.

The working fluid composition of the present invention which comprises a hydrofluorocarbon and a refrigerating oil comprising a compound having one or more ketone groups in the molecular structure as a base oil or the refrigerating oil mixed with the additives has a mixing ratio (hydrofluorocarbon/oil) normally of 5/1 to 1/10 (weight ratio), preferably 2/1 to 1/5 (weight ratio).

The hydrofluorocarbons which can be used in the present invention include difluoromethane (HFC32), 1,1-difluoroethane (HFC152a), 1,1,1-trifluoroethane (HFC143a), 1,1,1,2-tetrafluoroethane (HFC134a), 1,1,2,2-tetrafluoroethane (HFC134) and pentafluoroethane (HFC125), with preference given to 1,1,1,2-tetrafluoroethane (HFC134a) and difluoromethane (HFC32).

The working fluid composition for refrigerating machine of the present invention thus obtained has excellent compatibility and thermal stability, little problem in hydrolysis, and low hygroscopicity.

EXAMPLES

The present invention is hereinafter described in more detail by means of the following working examples. However, the present invention is not limited by these examples.

PRODUCTION EXAMPLE 1

720 g (10 mol) of methyl ethyl ketone and 40.5 g (0.5 mol) of 37% formaldehyde aqueous solution are placed in a 1-liter four-necked flask equipped with a stirrer, a thermometer, a dropping funnel and a reflux condenser. To this solution, 56 g (0.1 mol) of 10% KOH aqueous solution is added dropwise over a period of 2 hours at room temperature. After completion of the dropwise addition, the resulting mixture is refluxed for 2 hours. After cooling the refluxed mixture, it is transferred to a separating funnel to separate out the oil layer, followed by washing until the solution is neutralized. Thereafter, low-boiling point substances are distilled off to yield an oil 1 for the inventive product.

PRODUCTION EXAMPLE 2

100 g (1.0 mol) of methyl isobutyl ketone and 20 g (0.5 mol) of paraformaldehyde (purity: 75%) are placed in a 500-ml four-necked flask equipped with a stirrer, a thermometer, a dropping funnel and a reflux condenser. To this solution, 11.2 g (0.02 mol) of 10% by weight of KOH ethanol solution is added dropwise over a period of 2 hours at room temperature. After completion of the dropwise addition, the resulting mixture is refluxed for 2 hours. After cooling the refluxed mixture, it is transferred to a separating funnel to separate out the oil layer, followed by washing until the solution is neutralized. Thereafter, low-boiling point substances are distilled off to yield an oil 2 for the inventive product.

PRODUCTION EXAMPLE 3

30 g of sodium hydride (purity: 60% and liquid paraffin: 40%), net weight of sodium hydride being 18 g (0.75 mol), is introduced into 200 ml of dehydrated xylene in a 1-liter four-necked flask equipped with a stirrer, a thermometer, a dropping funnel and a nitrogen-inlet tube. While keeping the internal temperature at 130° C., 94.2 g (0.825 mol) of diisopropyl ketone is added dropwise over a period of about 5 hours. After completion of the dropwise addition, the reaction mixture is stirred for 30 minutes, and then 95.0 g (0.75 mol) of benzyl chloride is added dropwise thereto while cooling over a period of about 6 hours. After completion of the dropwise addition, the resulting mixture is stirred for about 1 hour, and then cooled until the internal temperature reached not more than 50° C. To this solution, 120 ml of water is added to dissolve sodium chloride for layer separation. The solution is further washed with 100 ml of 1% sulfuric acid aqueous solution and subsequently with 100 ml of water for once each. After removing the solvent using an evaporator, the mixture is distilled under reduced pressure to yield an oil 3 (2,2,4-trimethyl-1-phenyl-3-pentanone) for the inventive product.

PRODUCTION EXAMPLE 4

200.2 g (2.0 mol) of acetylacetone is placed in a reactor equipped with a stirrer, a nitrogen-inlet tube, a thermometer, a dropping funnel and a fractionating column. The reactor is heated to 120° C. Next, a mixture solution of 200.2 g (2.0 mol) of acetylacetone, 112.2 g (1.0 mol) of 1-octene and 48.1 g (0.2 mol) of benzoyl peroxide is added to the reactor dropwise over a period of 4 hours, and the stirring is continued for 1 hour.

Next, the reaction mixture is neutralized with 10% NaOH aqueous solution in an amount of 1.1 times based on the acid value thereof, and the reaction product is extracted with hexane.

Thereafter, after removing the solvent, the residue is distilled under reduced pressure at a temperature of 130° to 150° C. and a pressure of 0.3 to 0.5 Torr to yield 266.4 g (purity: 83.3%) of an oil 4 (adduct of 1 mol olefin) for the inventive product.

PRODUCTION EXAMPLE 5

450.6 g (4.0 mol) of acetonylacetone is placed in a reactor equipped with a stirrer, a nitrogen-inlet tube, a thermometer, a dropping funnel and a fractionating column. The reactor is heated to 180° C. Next, a mixture solution of 112.2 g (1.0 mol) of 1-octene and 29.2 g (0.2 mol) of di-tert-butyl peroxide is added to the reactor dropwise over a period of 5 hours, and the stirring is continued for 1 hour.

Thereafter, the reaction mixture is distilled under reduced pressure at a temperature of 170° to 176° C. and a pressure of 3 to 4 Torr to yield 84.0 g (purity: 90.2%) of an oil 5 (adduct of 1 mol olefin) for the inventive product. Thereafter, this oil is further distilled at a temperature of 176° to 200° C. and a pressure of 3 to 4 Torr to yield 18.2 g of an oil 6 (adduct of 2 mol olefin) for the inventive product.

PRODUCTION EXAMPLE 6

50.0 g (0.5 mol) of acetylacetone, 100 cc of acetone and 69.0 g (0.5 mol) of potassium carbonate are placed in a 500-ml four-necked flask equipped with a stirrer, a nitrogen-inlet tube, a thermometer, a dropping funnel and a reflux condenser tube. The solution is heated to 60° C. Next, 99.0 g (0.5 mol) of isoamyl iodide is added thereto dropwise over a period of 1 hour, and the stirring is continued for 30 hours.

Thereafter, the reaction mixture is distilled under reduced pressure at a temperature of 110° C. and a pressure of 20 Torr to yield 38 g (purity: 76%) of an oil 7 (3-isoamyl-2,4-pentanedione) for the inventive product.

PRODUCTION EXAMPLE 7

77.9 g (0.585 mol) of aluminum chloride (anhydride) and 350 ml of carbon tetrachloride are placed in a 1-liter four-necked flask equipped with a stirrer, a thermometer, a dropping funnel and a nitrogen-inlet tube. 95.2 g (0.585 mol) of 2-ethylhexanoyl chloride is added thereto dropwise over a period of 30 minutes. After completion of the dropwise addition, the stirring is continued for 30 minutes, and then 69.1 g (0.5 mol) of o-dimethoxybenzene is added thereto dropwise over a period of 2 hours. After completion of this dropwise addition, the stirring is continued for 1 hour. The reaction mixture is placed in a mixture of 400 g of ice and 90 ml of concentrated hydrochloric acid and decomposed, followed by separating into two layers. The oil layer is washed with diluted hydrochloric acid and then with saturated sodium bicarbanate aqueous solution. The solvent is removed using an evaporator, and then further distilled under reduced pressure to yield an oil 8 for the inventive product.

PRODUCTION EXAMPLE 8

An oil 9 for the inventive product is obtained in the same manner as in Production Example 7 except that 69.1 g (0.5 mol) of p-dimethoxybenzene dissolved in 140 ml of carbon tetrachloride is added dropwise in the place of o-dimethoxybenzene.

PRODUCTION EXAMPLE 9

143.0 g (1.04 mol) of 2-phenoxyethanol, 81.0 g (1.19 mol) of sodium ethylate and 291 g of 1,4-dioxane are placed in a 1-liter four-necked flask equipped with a stirrer, a thermometer, a distillating column and a nitrogen-inlet tube. The solution is heated to 90° to 105° C., and then 200 g of the solvent is removed in a period of 2 hours. The distillating column is then replaced by a dropping funnel, and 183.5 g (1.19 mol) of diethyl sulfate is added thereto dropwise at 45° C. over a period of 30 minutes. After stirring the reaction mixture at 60° C. for 1 hour, the reaction product is placed in water and extracted with ether. The solvent is removed using an evaporator, and further distilled under reduced pressure to yield 160 g of ethyl 2-phenoxyethyl ether.

An oil 11 for the inventive product is obtained in the same manner as in Production Example 7, except that 83.1 g (0.5 mol) of the above reaction product is added dropwise in the place of o-dimethoxybenzene, followed by stirring at 0° to 5° C.

PRODUCTION EXAMPLE 10

An oil 17 for the inventive product is obtained in the same manner as in Production Example 7 except that 120.2 g (0.5 mol) of isopropylbenzene is added dropwise in the place of o-dimethoxybenzene, followed by stirring at 0° to 5° C.

PRODUCTION EXAMPLE 11

An oil 18 for the inventive product is obtained in the same manner as in Production Example 10 except that 123.7 g (0.5 mol) of dodecylbenzene (soft type) (a reagent manufactured by Tokyo Kasei Kogyo Co., Ltd) is used in the place of isopropylbenzene.

EXAMPLE 1

The inventive products 1 through 19 and the comparative products 1 and 2, all of which comprise one of the oils 1 through 19 for the present invention and oils 1 and 2 for the comparative products shown in Tables 1 through 5 and 1,1,1,2-tetrafluoroethane (HFC134a) are prepared to determine the compatibility of these products. Oils 1 through 9, 11, 17 and 18 are those obtained in Production Examples 1 through 11; oils 10, 12 through 16, and 19 are those obtained by distilling commercially available oils shown in Tables 2 through 4. The two-phase separation temperature for 1,1,1,2-tetrafluoroethane at a low temperature is measured at an oil concentration of 10 vol %. The results are shown in Tables 1 through 5.

As is evident from Tables 1 through 5, the inventive products surpass the comparative products in compatibility. The chemical names of each compound for oils 1 through 19 for the inventive products are shown in Table 6.

EXAMPLE 2

With respect to the inventive products 1 through 19 and the comparative products 1 and 2, a sealed tube test is carried out under the following conditions to determine their thermal stability. Specifically, 10 g of oil and 5 g of HFC134a are placed in a glass tube. After adding iron, copper and aluminum as catalysts, the glass tube is sealed and tested at 175° C. for 14 days. Then, appearance of the composition comprising HFC134a and oil and the presence of deposition are evaluated. The results are shown in Tables 1 through 5.

As is evident from Tables 1 through 5, the inventive products have excellent appearance, no deposition, and excellent thermal stability.

EXAMPLE 3

With respect to the inventive products 1 through 19 and the comparative products 1 and 2, a sealed tube test is carried out under the following conditions to determine their thermal stability in the presence of water. Specifically, 10 g of oil and 5 g of HFC134a are placed in a glass tube, and water is added thereto at 3000 ppm based on the oil. After adding iron, copper and aluminum as catalysts, the glass tube is sealed and tested at 175° C. for 14 days. Then, the glass tube is unsealed, and the acid value of the oil is evaluated after removing HFC134a. The results are shown in Tables 1 through 5.

As is evident from Tables 1 through 5, all of the inventive products have no increase in the acid values when compared with that of the comparative product 2.

EXAMPLE 4

The inventive products 1 through 19 and the comparative products 1 and 2, all of which comprise one of the oils 1 through 19 for the inventive products and oils 1 and 2 for the comparative product and difluoromethane (HFC32) are prepared in the same manner as in Example 1 to determine the compatibility of these products. Specifically, the two-phase separation temperature for difluoromethane at a low temperature is measured at a sample concentration of 10 vol % based on difluoromethane. The results are shown in Tables 1 through 5.

As is evident from Tables 1 through 5, the inventive products surpass the comparative products in compatibility.

TABLE 1

| No. | Compound (Oil for Inventive Product) | Viscosity (cSt) 40° C. | Viscosity (cSt) 100° C. | Two-Phase Separation Temperature (°C.) HFC134a | Two-Phase Separation Temperature (°C.) HFC32 | Appearance of Catalyst | Appearance of Oil | Acid Value (mgKOH/g) Before | Acid Value (mgKOH/g) After |
| --- | --- | --- | --- | --- | --- | --- | --- | --- | --- |
| 1 | (Production Example 1) Methyl ethyl ketone/ Formaldehyde Condensation Product | 18.8 | 2.7 | −45 | 0< | good | good | 0.05> | 0.05> |
| 2 | (Production Example 2) Methyl isobutyl ketone/ Paraformaldehyde Condesation Product | 14.5 | 2.8 | −65 | 0< | " | " | " | " |
| 3 | (Production Example 3) | 4.1 | 1.4 | −25 | −16 | " | " | " | " |
| 4 | (Production Example 4) Adduct of 1 mol 1-Octene/ Acetylacetone | 3.1 | 1.2 | −28 | −17 | " | " | " | " |
| 5 | (Production Example 5) Adduct of 1 mol 1-Octene/ Acetonylacetone | 10.9 | 1.5 | −14 | −5 | " | " | " | " |
| 6 | (Production Example 5) Adduct of 2 mol 1-Octene/ Acetonylacetone | 14.9 | 3.1 | −17 | 0< | " | " | " | " |

TABLE 2

| No. | Compound (Oil for Inventive Product) | Viscosity (cSt) 40° C. | Viscosity (cSt) 100° C. | Two-Phase Separation Temperature (°C.) HFC134a | Two-Phase Separation Temperature (°C.) HFC32 | Appearance of Catalyst | Appearance of Oil | Acid Value (mgKOH/g) Before | Acid Value (mgKOH/g) After |
| --- | --- | --- | --- | --- | --- | --- | --- | --- | --- |
| 7 | (Production Example 6) | 2.2 | 0.9 | −70> | −40 | good | good | 0.05> | 0.05> |
| 8 | (Production Example 7) | 52.1 | 3.9 | −70> | −32 | " | " | " | " |

TABLE 2-continued

| | | Viscosity (cSt) | | Two-Phase Separation Temperature (°C.) | | Sealed Tube Test | | | |
|---|---|---|---|---|---|---|---|---|---|
| | | | | | | Appearance of | Appearance of | Acid Value (mgKOH/g) | |
| No. | Compound (Oil for Inventive Product) | 40° C. | 100° C. | HFC134a | HFC32 | Catalyst | Oil | Before | After |
| 9 | (Production Example 8) | 10.0 | 2.7 | −55 | Not Tested | " | " | " | " |
| 10 | [structure] *1 | 11.0 | 2.0 | −70> | −28 | " | " | " | " |

Remark
*1 Manufactured by Wako Pure Chemical Industries, Ltd.

TABLE 3

| | | Viscosity (cSt) | | Two-Phase Separation Temperature (°C.) | | Sealed Tube Test | | | |
|---|---|---|---|---|---|---|---|---|---|
| | | | | | | Appearance of | Appearance of | Acid Value (mgKOH/g) | |
| No. | Compound (Oil for Inventive Product) | 40° C. | 100° C. | HFC134a | HFC32 | Catalyst | Oil | Before | After |
| 11 | (Production Example 9) | 18.9 | 3.1 | −36 | −9 | good | good | 0.05> | 0.05> |
| 12 | [structure] *2 | 3.5 | 1.2 | −35 | 0< | " | " | " | " |
| 13 | [structure] *3 | 2.8 | 1.0 | −35 | −42 | " | " | " | " |
| 14 | [structure] *3 | 2.0 | 0.9 | −41 | −40 | " | " | " | " |
| 15 | [structure] *2 | 1.6 | 0.7 | −70> | −39 | " | " | " | " |

Remarks
*2) Manufactured by Tokyo Kasei Kogyo Co., Ltd.
*3) Manufactured by Aldrich Chemical Company, Inc.

TABLE 4

| No. | Compound (Oil for Inventive Product) | Viscosity (cSt) 40° C. | Viscosity (cSt) 100° C. | Two-Phase Separation Temperature (°C.) HFC134a | Two-Phase Separation Temperature (°C.) HFC32 | Appearance of Catalyst | Appearance of Oil | Acid Value (mgKOH/g) Before | Acid Value (mgKOH/g) After |
|---|---|---|---|---|---|---|---|---|---|
| 16 | 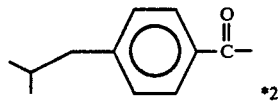 *2 | 3.2 | 1.2 | −70> | −41 | good | good | 0.05> | 0.05> |
| 17 | (Production Example 10) 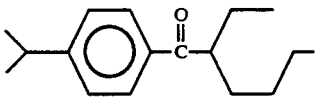 | 7.4 | 1.9 | −23 | 0< | " | " | " | " |
| 18 | (Production Example 11) 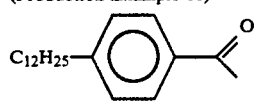 (soft alkyl type) | 16.0 | 3.0 | 0 | 0< | " | " | " | " |
| 19 | 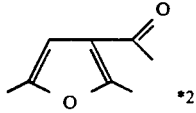 *2 | 1.4 | 0.7 | −70> | −48 | " | " | " | " |

Remark
*2) Manufactured by Tokyo Kasei Kogyo, Ltd.

TABLE 5

| No. | Compound (Oil for Comparative Product) | Viscosity (cSt) 40° C. | Viscosity (cSt) 100° C. | Two-Phase Separation Temperature (°C.) HFC134a | Two-Phase Separation Temperature (°C.) HFC32 | Appearance of Catalyst | Appearance of Oil | Acid Value (mgKOH/g) Before | Acid Value (mgKOH/g) After |
|---|---|---|---|---|---|---|---|---|---|
| 1 | Naphthenic Oil | 30.0 | 4.4 | 20< | 0< | good | good | 0.05> | 0.05> |
| 2 | Trimethylolpropane Tricaprylate | 17.0 | 4.0 | 8 | 0< | " | " | 0.05 | 7.3 |

TABLE 6

| Oil No. for Inventive Product | Name of Chemical Compound |
|---|---|
| 1 | Methyl ethyl ketone/Formaldehyde Condensation Product |
| 2 | Methyl isobutyl ketone/Paraformaldehyde Condensation Product |
| 3 | 2,2,4-trimethyl-1-phenyl-3-pentanone |
| 4 | Adduct of 1 mol 1-Octene/Acetylacetone |
| 5 | Adduct of 1 mol 1-Octene/Acetonylacetone |
| 6 | Adduct of 2 mol 1-Octene/Acetonylacetone |
| 7 | 3-Isoamyl-2,4-pentanedione |
| 8 | 1-(2-Ethylhexanoyl)-3,4-dimethoxybenzene |
| 9 | 1-(2-Ethylhexanoyl)-2,5-dimethoxybenzene |
| 10 | 3,4-Dimethoxyphenylacetone |
| 11 | 4-(2-Ethoxyethoxy)-(2-ethylhexanoyl)benzene |
| 12 | 2-Methoxyphenylacetone |
| 13 | 1-Acetyl-3-methoxybenzene |
| 14 | 1-Acetyl-2-methoxybenzene |
| 15 | 1-Acetyl-2,4-dimethylbenzene |
| 16 | 1-Acetyl-4-isobutylbenzene |
| 17 | 1-(2-Ethylhexanoyl)-4-isopropylbenzene |
| 18 | 1-Acetyl-4-dodecylbenzene (soft alkyl type) |
| 19 | 3-Acetyl-2,4-dimethylfuran |

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A working fluid composition for use in a refrigeration system which comprises a refrigerating oil comprising a compound having one or more ketone groups in the molecular structure as a base oil and a hydrofluorocarbon;

wherein said compound is represented by Formula (II):

wherein Q represents a monocyclic or dicyclic compound which may contain an oxygen atom in the ring thereof, $R_5$ represents a substituent having one or more ketone groups in the molecular structure and is selected from the group consisting of aliphatic acyl groups having a linear or branched structure, aromatic acyl groups, ketoacyl groups, acylalkyl groups, acylalkyloxy groups or acylaryloxy groups, alkyloxyacyl groups, and aryloxyacyl groups, $R_6$ represents a substituent having one or more ether groups in the molecular structure and is selected from the group consisting of alkyloxy groups, aryloxy groups, and alkyloxyalkyl groups or aryloxyalkyl groups, and x represents an integer of 1 to 20, and y represents an integer of 0 to 20, with the proviso that when x is two or more, each $R_5$ may be identical or different, and that when y is two or more, each $R_6$ may be identical or different.

2. The working fluid composition for use in a refrigeration system according to claim 1, wherein the mixing ratio by weight of the hydrofluorocarbon/refrigerating oil is 5/1 to 1/10.

3. The working fluid composition for use in a refrigeration system according to claim 1, wherein said compound has a number of carbon atoms of not less than 6 and not more than 300.

4. The working fluid composition for use in a refrigeration system according to claim 1, wherein x represents an integer of 1 to 4; and y represents an integer of 0 to 4.

5. The working fluid composition for use in a refrigeration system according to claim 1, wherein said hydrofluorocarbon is selected from the group consisting of difluoromethane (HFC32), 1,1-difluoroethane (HFC152a), 1,1,1-trifluoroethane (HFC143a), 1,1,1,2-tetrafluoroethane (HFC134a), 1,1,2,2-tetrafluoroethane (HFC134) and pentafluoroethane (HFC125).

* * * * *